March 3, 1931.   C. H. HAGSTEDT   1,794,849
ELECTRICAL CONDUIT COUPLING
Filed Feb. 27, 1928
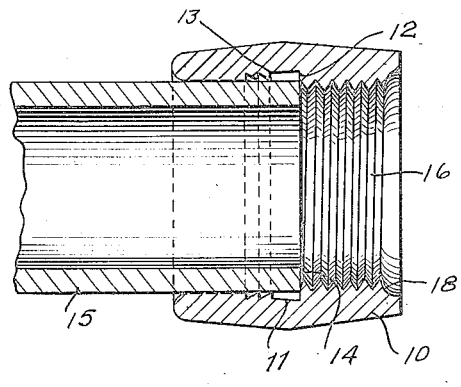
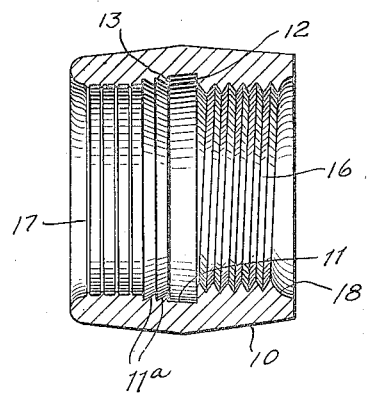
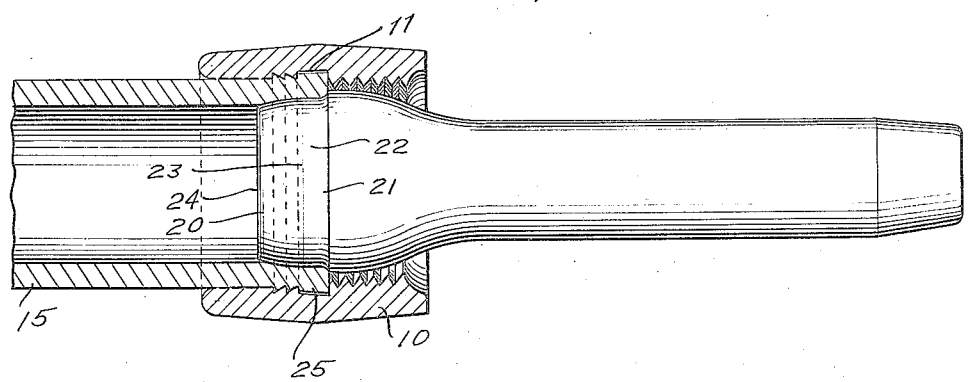
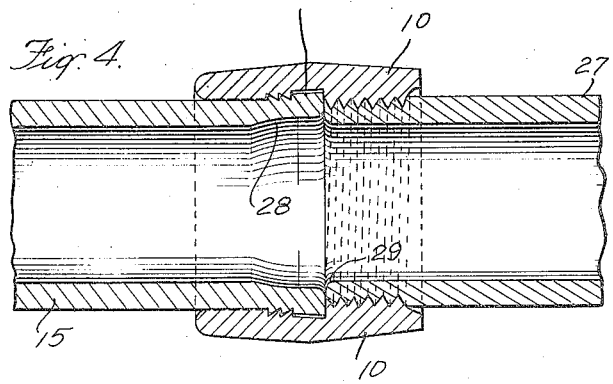
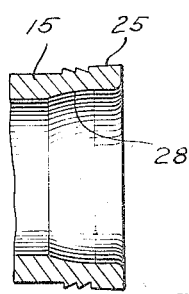
INVENTOR
CHARLES H. HAGSTEDT
BY Moses & Nolte
ATTORNEY Patented Mar. 3, 1931

1,794,849

UNITED STATES PATENT OFFICE

CHARLES H. HAGSTEDT, OF VALLEY STREAM, NEW YORK

ELECTRICAL-CONDUIT COUPLING

Application filed February 27, 1928. Serial No. 257,130.

This invention relates to conduits for housing electric conductors and is in the nature of an improvement upon the invention disclosed in my pending application, Serial No. 104,006, filed April 23, 1926, for electrical conduit couplings.

In common with said application it has for an object to provide for connecting the conduit sections inexpensively, with a minimum of parts and labor, and in a manner which assures convenient insertion of the conductor without the liability of injury and the consequent danger of fire, due to damaged insulation, when the cable is put into use.

The invention is designed for general use, as in the running of transmission lines and the installation of electrical systems in buildings.

It is customary to install the conduit system of a building or line prior to the insertion of the electrical conductor, as this avoids liability of damaging the conductor insulation during the construction of the building and of the conduit line. When the conduit is complete, a steel cable or "snake" is thrust through the conduit from end to end thereof, the electrical conductor is hooked onto the trailing end of the "snake" and the leading end of the "snake" is then pulled to draw the conductor through the conduit.

It is required, because of the fire risk resulting from damaged insulation, that the pipe sections forming the conduit shall butt and that their ends shall be smooth so as to present no burr or other irregularity likely to cut or otherwise damage the insulation when the cable is drawn through the conduit. The butting of the pipe sections is also important, for the reason that no obstruction should be offered to the thrusting through of the steel cable or "snake" by which the electrical conductors are drawn through the conduit.

The pipe for the conduit is accordingly furnished under specifications requiring that its ends shall be externally threaded and internally reamed, so that they may be connected to a coupling to form a smooth butt joint. These pipe sections, with the usual threaded couplings are suitable for use in many circumstances as when a long, straight line is to be run. They have the drawback, however, that the long pipe sections, and not the short, threaded coupling sleeves, have to be turned in effecting threaded connection.

Then too, it is inevitable in every installation that there will be a certain amount of cutting of the pipe sections to fit. Whenever a pipe is cut it presents an end having no threads on its exterior and having a sharp, inwardly projecting burr. It has been the practice heretofore for the workman to thread this end for the reception of a coupling, and it is a positive requirement that the burr be reamed out. Both of these operations take time and the reaming of the burr is apt to be slighted by a careless workman. As the inner end of the pipe is concealed when installed, it is impossible for the inspector to determine how carefully the reaming has been done. It is also difficult without injury to the line for the inspector to determine whether the pipes have been turned into mine whether such defective butting relation, and where such defective work is discovered the remedying of it requires tightening of all the joints along the line, because the tightening of one joint loosens the next.

This invention in common with my pending application referred to, relates to a coupling in which these liabilities of defects are completely eliminated, the threading of the cut end of the pipe is made unnecessary, and provision is made for the use of a union coupling in place of the straight, threaded coupling heretofore employed, whereby the junction of the pipes can be effected by turning of the coupling instead of the pipe itself.

Generally stated, this is accomplished by providing a coupling internally threaded at one end but having an unthreaded bore at the opposite end of sufficient diameter to receive the pipe. The smooth end of the coupling is inserted onto the smooth pipe end until the end wall of the pipe engages the shoulder formed by the innermost thread. A tapered punch is then inserted through the threaded end of the coupling and struck a few sharp blows. This is effective at one operation to eliminate the burr, to compact and harden the pipe end, and to spread the pipe end into a recess in the coupling so as to connect it inseparably to the coupling. Such connection, however, does not prevent the coupling from being turned with reference to the pipe.

The adjoining pipe section may now have its threaded end attached to the threaded end of the coupling, this operation being most conveniently effected by rotating the coupling until the threaded pipe section has been drawn into abutting relation with the end wall of the section having the unthreaded end.

With this method of connection, there is no possibility of the workman leaving a burr within the pipe because the elimination of the burr is a necessary incident to the expanding of the pipe to connect it to the coupling. It is easy for the inspector to determine whether the pipes have been turned into butting relation simply by applying a wrench to the coupling and undertaking to turn the coupling. If it is found that the pipes have not been caused to butt, the defect can be corrected by turning the coupling at that particular joint without disturbing the connection all along the line.

The features of the conduit and coupling as thus far described are common to the couplings of this application and of my pending application referred to above.

It is an object of the present invention to construct a conduit and coupling of the kind described and claimed in the above application in such a manner that greater mechanical strength and greater assurance of an electrical connection of minimum resistance between the various parts involved shall be secured. A good electrical connection of minimum resistance is desirable and essential in conduits for electrical wires or cables for the reason that such conduits are under some conditions, utilized to carry current. This happens under some conditions when leakage takes place from the electrical conductors within the conduit, and also in cases of lightning and the like. Any high resistance point that might be interposed in the conduits such as at points where portions thereof are joined together imperfectly, is likely to cause overheating or arcing, thereby introducing danger of fire.

To this end it is a feature of the invention that provision is made of a coupling having between the threaded and unthreaded bores thereof a circumferential groove which terminates adjacent the unthreaded bore in an abrupt shoulder.

In conjunction with this coupling of novel construction an expanding punch is utilized, having a tapered nose merging into a cylindrical body portion. The cylindrical body portion is comparable in length with the length of the circumferential groove of the coupling, and is provided for the purpose of assuring that the extremity of the conduit will be forced outward to form an external circumferential collar within the coupling groove, which collar will terminate in an abrupt shoulder in locking engagement with the abrupt shoulder of said groove. The coupling and conduit section are thus more securely and permanently united than heretofore, and a more perfect electrical connection is assured, for the reason that the second, or unthreaded, conduit section may be screwed up very tightly into abutting relation with the expanded unthreaded conduit section without any liability of dislodging the expanded conduit section from the coupling.

It is a further object of the invention to provide for scouring the enamel from the end of the unthreaded conduit section by the application of the coupling thereto. To this end the coupling is made to have a driving fit with the conduit section, and may also be provided with scouring projections in its unthreaded bore. The threaded extremity of the coupling is rabbeted to avoid mutilation of the coupling threads when the coupling is being driven onto the conduit section.

In the drawings forming a part of this specification:

Figure 1 is a longitudinal sectional view of the novel coupling;

Figure 2 is a longitudinal sectional view showing the unthreaded pipe section inserted in the coupling;

Figure 3 is a view similar to Figure 2 showing the punch in operative position just at the conclusion of its operation;

Figure 4 is a longitudinal sectional view showing the conduit sections connected in accordance with the present invention; and Figure 5 is a fragmentary, sectional view showing the shape assumed by the end of the conduit section 15 after it has been expanded in the coupling by the punch.

In the embodiment of the invention shown in the drawings, the novel coupling 10 is provided with an annular internal groove 11 disposed preferably at approximately its midpoint, the groove having an abutting shoulder 12 at one end thereof for engagement with the end face of a conduit section, and an abrupt, sharp-edged shoulder 13 at the other end thereof. While it is not absolutely essential, it is preferred that the depth of the groove increase from the shoulder 13 to the shoulder 12, the depth at the shoulder 13 being just sufficient to serve as a support or ledge for the expanded portion of the pipe which will be described hereinafter. The shoulder 12 is designed as an abutment of the forward end 14 of the pipe section 15. The portion of the coupling 10 lying on one side of the groove 11 is provided with an internal thread 16 while the portion lying on the other side thereof is provided with ridges 17 as shown in Figure 1 of the drawings. The threaded end of the coupling is rabbeted as shown at 18 in Figure 1 of the drawings.

The conduits or pipes utilized in such conduits are ordinarily made of steel and when received are coated with enamel, the enamel coating serving the purpose of protecting the pipes from injurious external influences. In order to obtain a good electrical connection between the coupling 10 and the pipe 15, the internal diameter of the portion 17 of the coupling is made substantially equal to the external diameter of the pipe 15 so that a driving fit may be had between the two elements, the connection being such that relative rotation of the two elements may be had by the application of the necessary amount of force. When the coupling is driven onto the pipe 15 the ridges 17 serve to scale the enamel off that end of the pipe so that good electrical contact between the coupling and the pipe may be had. The rabbeted end 18 of the coupling which receives the driving blows, protects the thread 16 against any injury.

The unthreaded end of the coupling adjacent the recess 11 may be formed with one or more tapering recesses 11a, which recesses have sharp shoulders formed at their extremities remote from groove 11 so that the pipe metal, when expanded by the punch, will be forced into the recesses, and shoulders will be formed on the pipe for supplementing the longitudinal support afforded by the shouldered lower end of the recess 11. The interlocking effected by the provision of these supplementary recesses 11a is clearly illustrated in Figures 3 and 4.

After the coupling and the pipe 15 are assembled in the manner shown in Figure 2 so that the end 14 thereof abuts the shoulder 12 of the annular groove 11, the punch 19 is inserted in the manner shown in Figure 3 and is struck a few sharp blows. This operation is effective to drive the end 20 of the punch into the pipe end 15, this resulting in the elimination of the burr that may have been formed on the end 14 of the pipe during the process of cutting, and this operation also drives the outer end portion of the pipe into the groove 12 and a connection of the type shown in Figures 3 and 4 is obtained.

The punch 19 is provided with a concave shoulder 21 which in operation abuts against the inner edge of the pipe 15 and serves to eliminate the burr that may exist on that end. The portion 22 immediately adjacent the beveled portion 21 is preferably substantially cylindrical and its lower edge 23 is preferably so disposed that it does not reach to the shoulder 13 of the annular groove 11. The nose 24 of the punch is slightly tapered as shown. When the punch is inserted into the open end of the pipe 15 and a few sharp blows are administered to the shank of the punch, the beveled portion 21 serves to eliminate the burr while the portions 22 and 24 serve to spread the end of the pipe in such a manner that a circumferential collar 25 is formed on the outer free end of the pipe 15 which fits in groove 11 and the collar is provided with an abrupt shoulder 26 which cooperates with the shoulder 13 of the annular groove to lock the pipe in place.

It will thus be seen that during the process of forming the joint between the pipe 15 and the coupling 10, the enamel is scaled off the outer face at the end of the pipe, a firm connection is formed between the two elements of such a nature as to form electrical contact between the two elements of minimum resistance, and at the same time an interengagement or interlocking of the elements is effected of sufficient strength to prevent any subsequent disengagement of the two or any loosening or weakening of the joint. The two elements are nevertheless maintained rotatable with relation to each other so that the coupling may be operated as a union.

The threaded pipe section 27 is now attached to the coupling 10 by threading the pipe into the threaded end 16 of the coupling. Such threading may be effected by holding the coupling stationary and turning the pipe, but it can generally be effected more conveniently by holding the pipe stationary and turning the coupling. This turning is carried on until further turning is positively prevented by the butting of the ends of the pipe sections 15 and 27. Such butting also forces the expanded end of pipe section 15 into firmer engagement with the coupling 10, taking up any slight play which may previously have been present. It will be observed upon examination of Figure 4 that the driving of the punch not only eliminates the burr of pipe section 15, but that it also provides a smooth, slightly rounded interior surface 28 which merges smoothly with the interior surface 29 of pipe section 27.

The coupling 10 is inexpensive, it being simply a straight, non-reducing coupling.

With the construction described, it will be evident that the joint will present no obstruction to the thrusting through of the "snake", and that it will have no burr or other sharp protuberance tending to cut the insulation of the electrical conductor when the latter is drawn through.

As will be obvious, the present invention is applicable to pipes of the character commonly used for electrical conduits, which pipes are of relatively hard metal, usually iron or steel, as distinguished from lead piping which is not used in this class of work. The method and construction disclosed are inapplicable to pipes of very soft material, such as lead, which cannot be strongly united by threaded couplings and which could not be secured to a coupling of the form disclosed with a shallow recess in it by expanding with a punch as the expanded material would offer too little resistance to prevent it from slipping out of the coupling if any force were applied thereto. It will be understood, therefore, that the piping referred to herein is what may be termed hard metal piping which is made of a material of sufficient strength and rigidity so that when the end of the pipe is slightly expanded as described, it will seat itself firmly within the coupling and will resist all the strains which are commonly encountered in electrical conduit work without being pulled out of the coupling. It will also be noted that after it is once expanded by the punch no internal nipple or other auxiliary device is needed to hold it expanded. This is important not only as making the structure simpler and cheaper, but because the presence of any member inside of the conduit would tend to obstruct the same and interfere with the free introduction of the "snake" and the electrical conductors. The pipe is also so firmly held within the coupling that it will permit the screw threaded end of the adjacent pipe to be screwed into firm abutting engagement with it so as to effect a strong and solid connection between the two pipe sections providing for proper electrical contact between them and for a smooth internal finish at the joint as already described.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What I claim is:

1. In a conduit joint of the class described, a tubular coupling having an inner annular groove at approximately its midpoint, said groove having an abrupt shoulder on each side thereof extending substantially at right angles to the axis of the coupling, the inner surface of the coupling on one side of the groove being threaded, and the inner surface of the coupling on the opposite side of the groove being ridged.

2. In a conduit joint of the class described, a tubular coupling having an inner annular groove at approximately its midpoint, a shoulder portion on each side of the groove extending substantially at right angles to the axis of the coupling, the inner surface of the coupling on one side of the groove being threaded to receive the threaded end of a conduit pipe, and the other end of the coupling being adapted to receive the unthreaded end of another conduit.

3. A coupling for connecting electrical conduits having a threaded bore at one end thereof, an unthreaded bore at the opposite end thereof, and a plurality of recesses intermediate the threaded and unthreaded ends into which a conduit section may be expanded, said recesses being formed to provide shoulders extending substantially at right angles to the axis of the coupling for interfitting with the expanded conduit section to prevent separation of said section and the coupling.

4. In a conduit joint of the class described, a tubular coupling having a threaded bore at one end thereof, an unthreaded bore at the opposite end thereof, and a circumferential groove between said bores, said groove being bounded by a shoulder extending substantially at right angles to the axis of the coupling adjacent the unthreaded bore.

5. In a conduit joint of the class described, a tubular coupling having a threaded bore at one end thereof, an unthreaded bore at the opposite end thereof, and a circumferential groove between said bores, said groove being shouldered substantially at right angles to the axis of the coupling adjacent the unthreaded bore, a conduit section inserted in the unthreaded bore, and having its end expanded in the groove to form an abrupt shoulder on the conduit section interlocked with the shoulder of the groove for preventing separation of the coupling and the conduit section.

6. A conduit coupling having a threaded bore at one end thereof, an unthreaded bore at the opposite end thereof adapted to have a driving fit with a conduit section, said coupling also having a circumferential groove intermediate said bores and being provided with a rabbet at its threaded extremity to enable the coupling to be driven on the conduit section without mutilation of the threads.

7. A conduit coupling having a threaded bore at one end thereof, an unthreaded bore at the opposite end thereof adapted to be driven onto a conduit section and provided with internal projections for scouring the conduit as it is driven on the conduit, and also having a circumferential groove intermediate said bores and being provided with a rabbet at its threaded extremity to enable the coupling to be driven on the conduit section without mutilation of the threads.

In testimony whereof, I have affixed my signature to this specification.

CHARLES H. HAGSTEDT.